(12) United States Patent
Nemoto et al.

(10) Patent No.: US 11,100,663 B2
(45) Date of Patent: Aug. 24, 2021

(54) CONSTRUCTION MANAGEMENT DEVICE AND CONSTRUCTION MANAGEMENT METHOD

(71) Applicant: Komatsu Ltd., Tokyo (JP)

(72) Inventors: Yuuichi Nemoto, Tokyo (JP); Mitsuhiro Aoki, Tokyo (JP)

(73) Assignee: Komatsu LTD., Tokyo (JP)

( * ) Notice: Subject to any disclaimer, the term of this patent is extended or adjusted under 35 U.S.C. 154(b) by 0 days.

(21) Appl. No.: 16/606,816

(22) PCT Filed: Jun. 27, 2018

(86) PCT No.: PCT/JP2018/024382
§ 371 (c)(1),
(2) Date: Oct. 21, 2019

(87) PCT Pub. No.: WO2019/049475
PCT Pub. Date: Mar. 14, 2019

(65) Prior Publication Data
US 2020/0388043 A1    Dec. 10, 2020

(30) Foreign Application Priority Data
Sep. 8, 2017   (JP) .............................. JP2017-173237

(51) Int. Cl.
*G06T 7/593* (2017.01)
*H04N 13/243* (2018.01)
(Continued)

(52) U.S. Cl.
CPC .............. *G06T 7/593* (2017.01); *E02F 9/261* (2013.01); *G01C 11/06* (2013.01); *H04N 5/247* (2013.01);
(Continued)

(58) Field of Classification Search
CPC ................................. G06T 7/593; G06T 17/05
See application file for complete search history.

(56) References Cited

U.S. PATENT DOCUMENTS

| 6,023,276 A | 2/2000 | Kawai et al. |
| 9,070,216 B2 | 6/2015 | Golparvar-Fard et al. |
| (Continued) | | |

FOREIGN PATENT DOCUMENTS

| CN | 1979087 A | 6/2007 |
| CN | 101576382 A | 11/2009 |
| (Continued) | | |

OTHER PUBLICATIONS

"3D Extraction and Reconstruction of Manmade Objects based on Stereo Image Pair", Ph D. Dissertation, Shao Zhenfeng, Supervised by Prof. Li Deren, Wuhan University (2004).
(Continued)

*Primary Examiner* — Chikaodili E Anyikire
(74) *Attorney, Agent, or Firm* — Locke Lord LLP

(57) ABSTRACT

A selection unit selects a target image pair which is a processing target from among a plurality of image pairs captured by imaging devices provided in work machines. A stereo measurement unit generates three-dimensional data representing a landform on the basis of the selected target image pair, by using a camera parameter related to the imaging device of the work machine having imaged the selected target image pair.

18 Claims, 9 Drawing Sheets

(51) Int. Cl.
  E02F 9/26 (2006.01)
  G01C 11/06 (2006.01)
  H04N 5/247 (2006.01)
  H04N 13/00 (2018.01)

(52) U.S. Cl.
  CPC . *H04N 13/243* (2018.05); *G06T 2207/20092* (2013.01); *G06T 2207/30252* (2013.01); *H04N 2013/0081* (2013.01)

(56) References Cited

U.S. PATENT DOCUMENTS

| | | | |
|---|---|---|---|
| 2007/0140528 | A1 | 6/2007 | Anai et al. |
| 2013/0155058 | A1* | 6/2013 | Golparvar-Fard ...... G06T 17/00 345/419 |
| 2015/0094953 | A1* | 4/2015 | Montgomery .......... E02F 9/261 701/514 |
| 2015/0249821 | A1 | 9/2015 | Tanizumi et al. |
| 2016/0104289 | A1* | 4/2016 | Chang .................. G05D 1/0248 382/154 |
| 2016/0312432 | A1* | 10/2016 | Wang .................... E02F 9/2012 |
| 2016/0312446 | A1 | 10/2016 | Pettersson et al. |
| 2017/0083760 | A1 | 3/2017 | Kiyota |
| 2017/0284071 | A1 | 10/2017 | Yamaguchi et al. |
| 2018/0162011 | A1* | 6/2018 | Friend .................... E02F 9/261 |
| 2018/0216318 | A1 | 8/2018 | Shike |
| 2018/0245311 | A1 | 8/2018 | Shike et al. |
| 2019/0026914 | A1* | 1/2019 | Hageman ............. H04N 13/246 |
| 2019/0352885 | A1* | 11/2019 | Kurokami ............... B66C 23/88 |

FOREIGN PATENT DOCUMENTS

| | | |
|---|---|---|
| CN | 101915569 A | 12/2010 |
| CN | 104662389 A | 5/2015 |
| CN | 104778740 A | 7/2015 |
| CN | 105046426 A | 11/2015 |
| CN | 105225265 A | 1/2016 |
| CN | 105867404 A | 8/2016 |
| CN | 106029994 A | 10/2016 |
| CN | 106066645 A | 11/2016 |
| CN | 106354869 A | 1/2017 |
| CN | 106462961 A | 2/2017 |
| EP | 0361297 A1 | 4/1990 |
| EP | 0689167 B1 | 8/2001 |
| JP | 08-016783 A | 1/1996 |
| JP | 2003-075148 A | 3/2003 |
| JP | 2009-058359 A | 3/2009 |
| JP | 2017-071915 A | 4/2017 |
| WO | 2013/062557 A1 | 5/2013 |
| WO | 2017/061515 A1 | 4/2017 |

OTHER PUBLICATIONS

«23rd Congress of the International-Society-for-Photogrammetry-and- Remote-Sensing (ISPRS))) B5, 5, Jun. 19, 2016, Tuttas.S et al. Evaluation of Acquisition Strategies for Image-Based Construction Site Monitoring (2016).

* cited by examiner

CONSTRUCTION MANAGEMENT DEVICE AND CONSTRUCTION MANAGEMENT METHOD

TECHNICAL FIELD

The present invention relates to a construction management device and a construction management method.

Priority is claimed on Japanese Patent Application No. 2017-173237, filed on Sep. 8, 2017, the content of which is incorporated herein by reference.

BACKGROUND ART

As disclosed in PTL 1, there is a technique in which a pair of images is captured by an imaging device attached to a work machine, and a computer of the work machine generates three-dimensional data representing a landform on the basis of the images.

CITATION LIST

Patent Literature

[PTL 1] Japanese Unexamined Patent Application, First Publication No. 2017-071915

SUMMARY OF INVENTION

Technical Problem

There is a desire to calculate an amount of work performed in a predetermined period (for example, from a construction start time to a certain time thereafter) on the basis of images captured by an imaging device. In order to calculate the amount of work, it is necessary to compute three-dimensional data of a landform at a time and a location which are measurement targets by using a plurality of pairs of images captured in the past.

An aspect of the present invention is directed to providing a construction management device and a construction management method capable of computing three-dimensional data of a landform at any time or location.

Solution to Problem

According to a first aspect of the present invention, there is provided a construction management device generating three-dimensional data of a construction site by using a plurality of work machines which are disposed at the construction site and each of which includes an imaging device, the construction management device including a camera parameter storage unit that stores a plurality of camera parameters associated with each imaging device of the plurality of work machines; a selection unit that selects a target image pair which is a processing target on the basis of input from a user from among a plurality of image pairs captured by the imaging devices provided in the plurality of work machines; and a stereo measurement unit that generates three-dimensional data representing a landform of a periphery of a work machine having captured the target image pair on the basis of the selected target image pair, by using a camera parameter related to the imaging device of the work machine having captured the selected target image pair among the plurality of camera parameters stored in the camera parameter storage unit.

Advantageous Effects of Invention

According to the aspect, the construction management device can compute three-dimensional data of a landform at anytime point or any location.

DESCRIPTION OF EMBODIMENTS

First Embodiment

<<Configuration of Construction Management System>>

Figure 1:
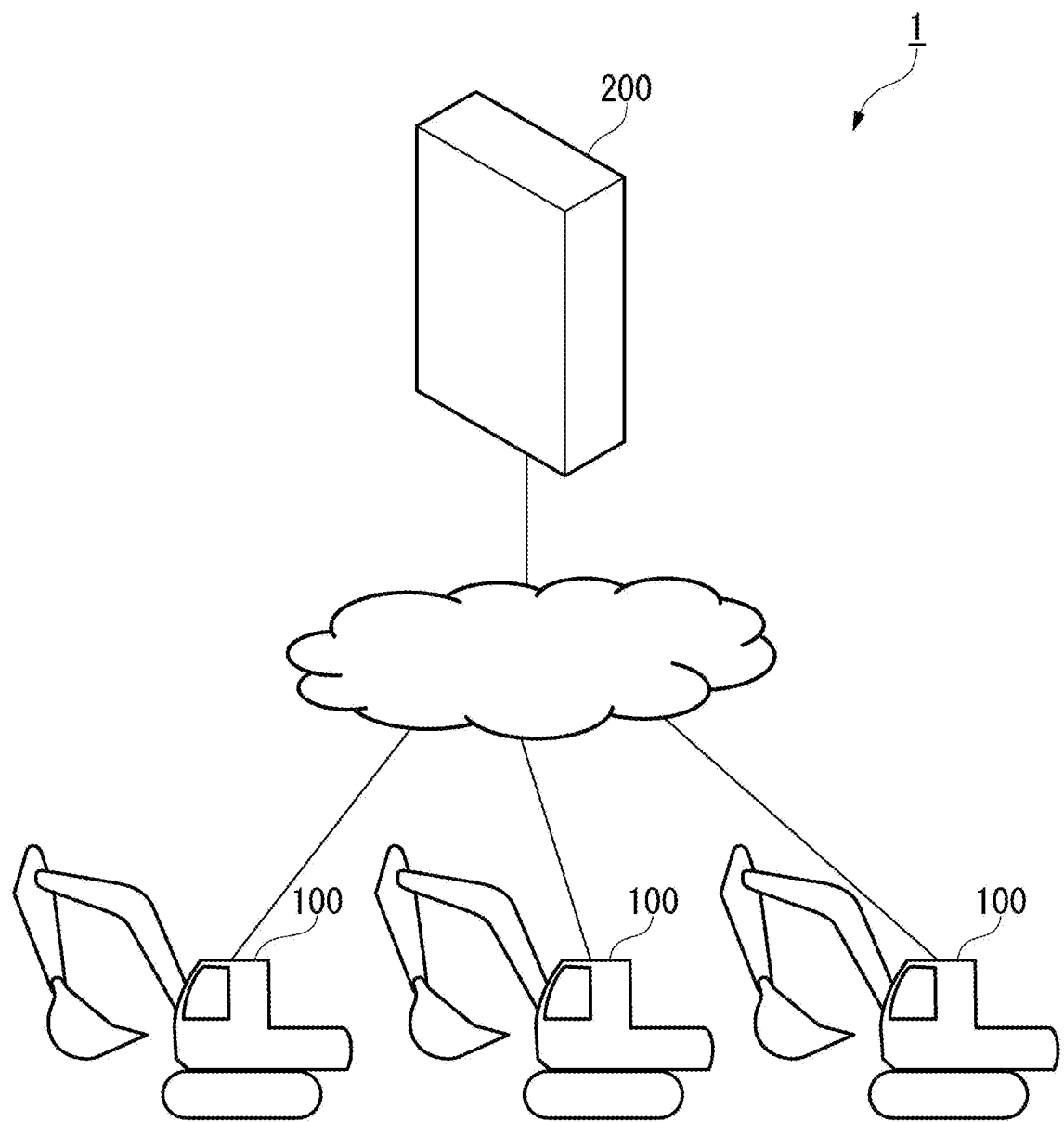
FIG. 1 is a configuration diagram of a construction management system according to a first embodiment.

FIG. 1 is a configuration diagram of a construction management system according to a first embodiment.

A construction management system 1 includes a plurality of hydraulic excavators 100 and a construction management device 200. The construction management system 1 is a system managing a state in which the hydraulic excavators 100 construct a construction site. The hydraulic excavators 100 and the construction management device 200 are connected to each other via a network.

The hydraulic excavator 100 performs work such as excavation or banking at the construction site. The hydraulic excavator 100 is provided with a stereo camera configured with at least one pair of imaging devices, and captures at least one image having disparity. Hereinafter, a pair of images captured by the stereo camera will be referred to as an image pair. The image pair is transmitted to the construction management device 200. The hydraulic excavator 100 is an example of a work machine. In other embodiments, a work machine which is not a hydraulic excavator 100 may be provided with a stereo camera.

The construction management device 200 receives an image pair in which the construction site is captured from the hydraulic excavator 100, and manages the image pair in association with an ID of the hydraulic excavator 100 and an imaging time. The construction management device 200 performs stereo measurement on the image pair, so as to generate point group data representing a landform of the construction site. The construction management device 200 calculates an amount of earthwork (an amount of work done) in the construction site by using the point group data. The point group data is an example of three-dimensional data. In other embodiments, as three-dimensional data, triangulated irregular network (TIN) data, digital elevation model (DEM) data, polygon data, or voxel data may be generated.

<<Configuration of Hydraulic Excavator>>

Figure 2:
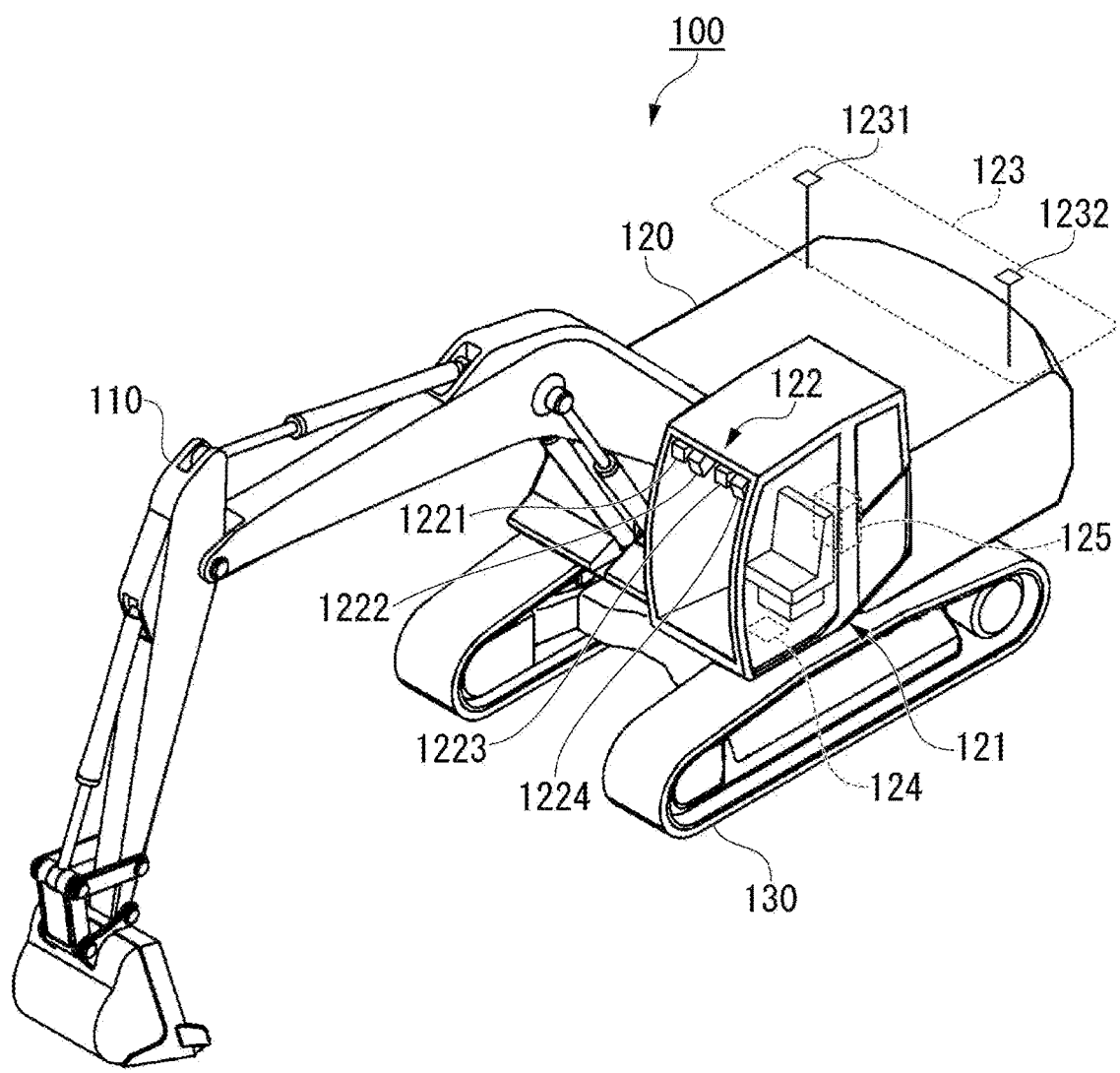
FIG. 2 is a perspective view showing an exterior of a hydraulic excavator according to the first embodiment.

FIG. 2 is a perspective view showing an exterior of the hydraulic excavator according to the first embodiment.

The hydraulic excavator 100 which is a work machine includes a work equipment 110 which is operated by hydraulic pressure, a slewing body 120 supporting the work equipment 110, and a traveling body 130 supporting the slewing body 120.

<<Vehicle Body of Hydraulic Excavator>>

The slewing body 120 is provided with a cab 121 for an operator to get in. A stereo camera 122 is provided on an upper part of the cab 121. The stereo camera 122 is provided on a front side and an upper side in the cab 121. The stereo camera 122 images the front of the cab 121 through a windshield of a front surface of the cab 121. The stereo camera 122 includes at least one camera. In the first embodiment, the stereo camera 122 includes two pairs of imaging devices. In other words, the stereo camera 122 includes four imaging devices. Specifically, the stereo camera 122 includes a first camera 1221, a second camera 1222, a third camera 1223, and a fourth camera 1224 in this order from the right. Each imaging device may be, for example, an imaging device using a charge coupled device (CCD) sensor and a complementary metal oxide semiconductor (CMOS) sensor.

The first camera 1221 and the third camera 1223 are a pair of imaging devices. The first camera 1221 and the third camera 1223 are provided with a gap in the leftward-and-rightward direction such that each optical axis thereof is substantially parallel to a floor surface of the cab 121.

The second camera 1222 and the fourth camera 1224 are a pair of imaging devices. The second camera 1222 and the fourth camera 1224 are provided with a gap in the leftward-and-rightward direction such that optical axes thereof are substantially parallel to each other, and the optical axes are tilted further downward than the front side of the cab 121 with respect to the floor surface of the cab 121.

A distance between the stereo camera 122 and an imaging target may be calculated by using a pair of images (image pair) captured by at least one pair of imaging devices of the stereo camera 122. In other embodiments, the stereo camera 122 may be configured with a single pair of cameras, and may be configured with three or more pairs of cameras.

<<Control System of Hydraulic Excavator>>

The hydraulic excavator 100 includes the stereo camera 122, a position/azimuth calculator 123, an inclination detector 124, and a control device 125.

The position/azimuth calculator 123 calculates a position of the slewing body 120 and an azimuth in which the slewing body 120 is directed. The position/azimuth calculator 123 includes a first receiver 1231 and a second receiver 1232 which receive positioning signals from an artificial satellite configuring a global navigation satellite system (GNSS). The first receiver 1231 and the second receiver 1232 are provided at different positions of the slewing body 120. The position/azimuth calculator 123 detects a position of a representative point (the origin of a vehicle body coordinate system) of the slewing body 120 in a site coordinate system on the basis of a positioning signal received by the first receiver 1231. An example of the GNSS may include a global positioning system (GPS).

The position/azimuth calculator 123 calculates the azimuth of the slewing body 120 in which the slewing body 120 is directed, as a relationship between a detected installation position of the first receiver 1231 and an installation position of the second receiver 1232, by using a positioning signal received by the first receiver 1231 and a positioning signal received by the second receiver 1232.

The inclination detector 124 measures acceleration and angular velocity of the slewing body 120, and detects a posture (for example, a roll angle, a pitch angle, and a yaw angle) of the slewing body 120 on the basis of measurement results. The inclination detector 124 is provided on, for example, a lower surface of the cab 121. As the inclination detector 124, for example, an inertial measurement unit (IMU) may be used.

Figure 3:
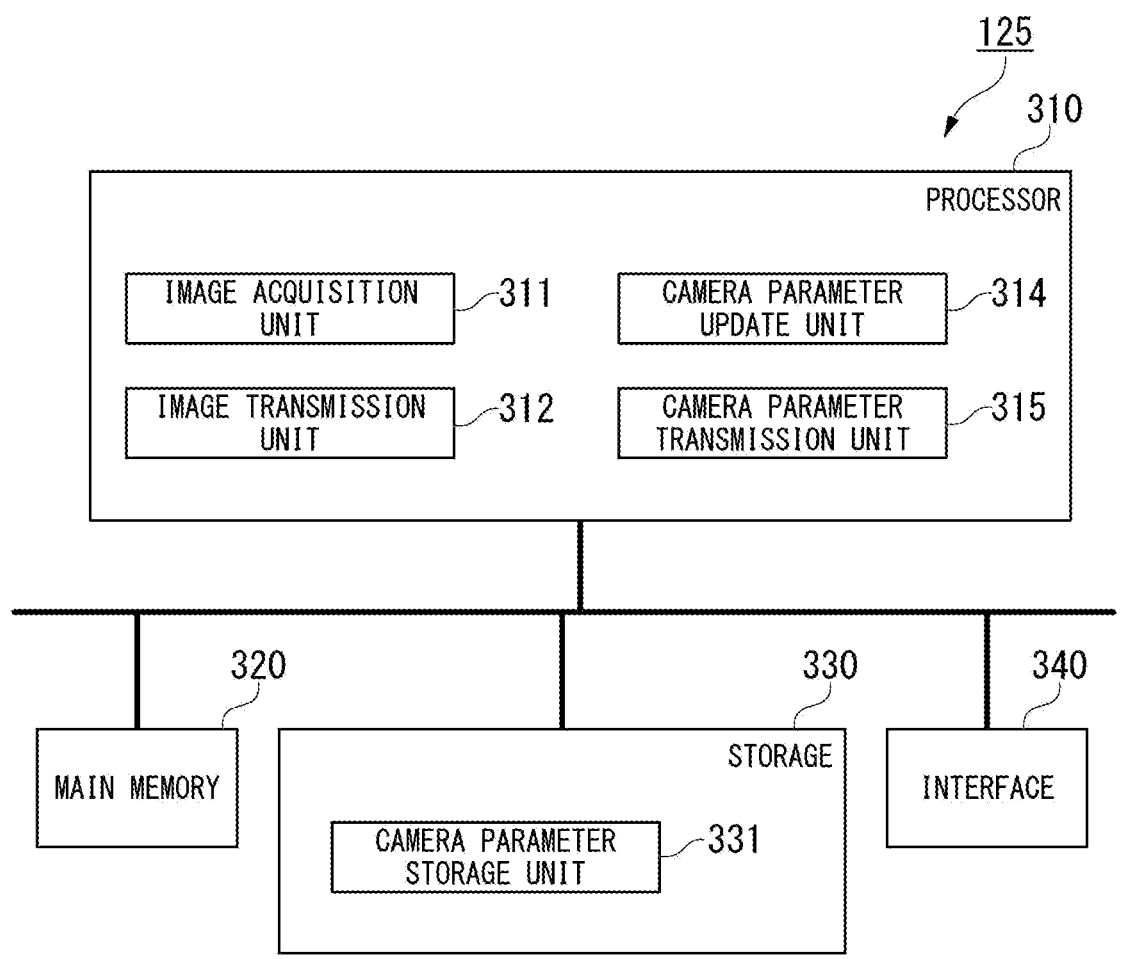
FIG. 3 is a schematic diagram showing a configuration of a control device of the hydraulic excavator according to the first embodiment.

FIG. 3 is a schematic diagram showing a configuration of the control device of the hydraulic excavator according to the first embodiment.

The control device 125 is a computer including a processor 310, a main memory 320, a storage 330, and an interface 340. The storage 330 stores a program. The processor 310 reads the program from the storage 330, delivers the program to the main memory 320, and executes processes according to the program. The control device 125 is connected to the network via the interface 340.

The storage 330 has a storage region as a camera parameter storage unit 331. Examples of the storage 330 may include a hard disk drive (HDD), a solid state drive (SSD), a magnetic disk, a magneto-optical disc, a compact disc read only memory (CD-ROM), a digital versatile disc read only memory (DVD-ROM), and a semiconductor memory. The storage 330 may be an internal medium which is directly connected to a bus of the control device 125, and may be an external medium which is connected to the control device 125 via the interface 340. The storage 330 is a non-transitory storage medium.

The camera parameter storage unit 331 stores camera parameters of the stereo camera 122. The camera parameters are parameters used for stereo measurement using an image pair. The camera parameters include, for example, internal parameters, external parameters, and vehicle body parameters. The internal parameters are parameters indicating characteristics of each imaging device. Examples of the internal parameters may include a focal length of an optical system of the imaging device, a position of an intersection between an optical axis of the optical system of the imaging device and an imaging surface of an image sensor, and a distortion coefficient of an imaging device lens in a radial direction. The external parameters are parameters indicating a positional relationship between a pair of imaging devices. Examples of the external parameters may include a relative position, a relative posture (a roll angle, a pitch angle, and a yaw angle) between a pair of imaging devices. The vehicle body parameters include a camera position in the vehicle body coordinate system. The vehicle body parameters are parameters used to convert the vehicle body coordinate system and the camera coordinate system into each other.

The processor 310 includes an image acquisition unit 311, an image transmission unit 312, a camera parameter update unit 313, and a camera parameter transmission unit 314.

The image acquisition unit 311 acquires an image pair captured by the stereo camera 122, a position and an azimuth of the slewing body 120 measured by the position/azimuth calculator 123, and a posture of the slewing body 120 measured by the inclination detector 124.

The image transmission unit 312 transmits an ID of the hydraulic excavator 100, the image pair captured by the stereo camera 122, an imaging time of the image pair, the position and the azimuth of the slewing body 120 measured by the position/azimuth calculator 123, and the posture of the slewing body 120 measured by the inclination detector 124, to the construction management device 200 in association with each other.

The camera parameter update unit 313 updates a camera parameter stored in the camera parameter storage unit 331 whenever the stereo camera 122 is calibrated.

The camera parameter transmission unit 314 transmits an ID of the hydraulic excavator, a camera parameter, and an update time thereof to the construction management device 200 whenever the camera parameter stored in the camera parameter storage unit 331 is updated by the camera parameter update unit 313.

The control device 125 may perform stereo measurement using an image pair captured by the stereo camera 122 and a camera parameter stored in the camera parameter storage unit 331, separately from the construction management device 200.

<<Construction Management Device 200>>

Figure 4:
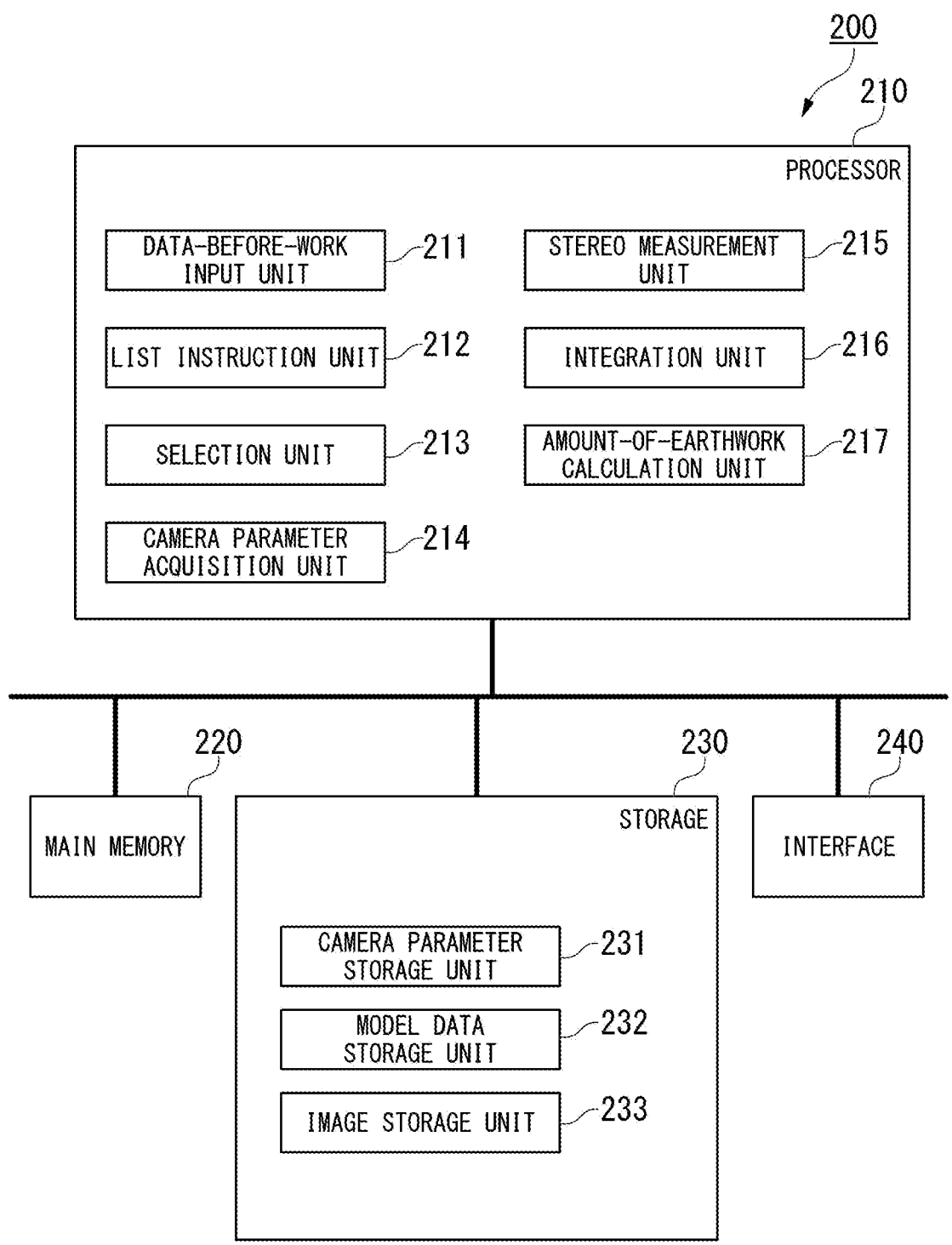
FIG. 4 is a schematic diagram showing a configuration of the construction management device according to the first embodiment.

FIG. 4 is a schematic diagram showing a configuration of the construction management device according to the first embodiment.

The construction management device 200 is a computer including a processor 210, a main memory 220, a storage 230, and an interface 240. The storage 230 stores a construction management program P. The processor 210 reads the construction management program P from the storage 230, delivers the construction management program P to the main memory 220, and executes processes according to the construction management program P. The construction management device 200 is connected to the network via the interface 240. The construction management device 200 is connected to input and output devices (not shown) via the interface 240.

The storage 230 has storage regions as a camera parameter storage unit 231, a model data storage unit 232, and an image storage unit 233. Examples of the storage 230 may include a hard disk drive (HDD), a solid state drive (SSD), a magnetic disk, a magneto-optical disc, a compact disc read only memory (CD-ROM), a digital versatile disc read only memory (DVD-ROM), and a semiconductor memory. The storage 230 may be an internal medium which is directly connected to a bus of the construction management device 200, and may be an external medium which is connected to the construction management device 200 via the interface 240. The storage 230 is a non-transitory storage medium.

The camera parameter storage unit 231 stores a camera parameter to be associated with an ID of the hydraulic excavator 100 and an uptime time of the camera parameter of the stereo camera 122 provided in the hydraulic excavator 100. In other words, the camera parameter storage unit 231 stores each of a plurality of time points to be associated with camera parameters related to a pair of imaging devices at the time point. A camera parameter differs in the stereo camera 122 provided in each hydraulic excavator 100. Even in an identical stereo camera 122, a camera parameter is updated whenever calibration work is performed. The camera parameter storage unit 331 stores a camera parameter for each ID of the hydraulic excavator 100 whenever calibration work is performed (for each update time). The camera parameter storage unit 331 may store the camera parameter on the basis of a file system having a directory structure. For example, the camera parameter storage unit 331 stores site directories allocated to respective construction sites. The camera parameter storage unit 331 stores machine directories allocated to the respective hydraulic excavators 100 disposed in the construction site under each site directory. The camera parameter storage unit 331 stores a camera parameter of the hydraulic excavator 100 for each update time under each machine directory.

The model data storage unit 232 stores a model of the hydraulic excavator 100 to be associated with model specific data such as installation positions of the first receiver 1231 and the second receiver 1232 in the model. As described above, a position of the first receiver 1231 is a representative point (the origin in the vehicle body coordinate system) of the slewing body 120 in the site coordinate system. In other words, the model specific data may be used as a parameter for converting the site coordinate system and the vehicle body coordinate system into each other. Consequently, the construction management device 200 can compensate for a difference between models, such as a case where an installation position of a reception antenna for the GNSS differs depending on a model of the hydraulic excavator 100.

The image storage unit 233 stores an ID of the hydraulic excavator 100 and an imaging time to be associated with an image pair captured by the stereo camera 122 of the hydraulic excavator 100 at the imaging time. The image pair stores therein a position and an azimuth of the slewing body 120 measured by the position/azimuth calculator 123 of the hydraulic excavator 100 and a posture of the slewing body 120 measured by the inclination detector 124 at the imaging time to be associated with each other.

Figure 5:
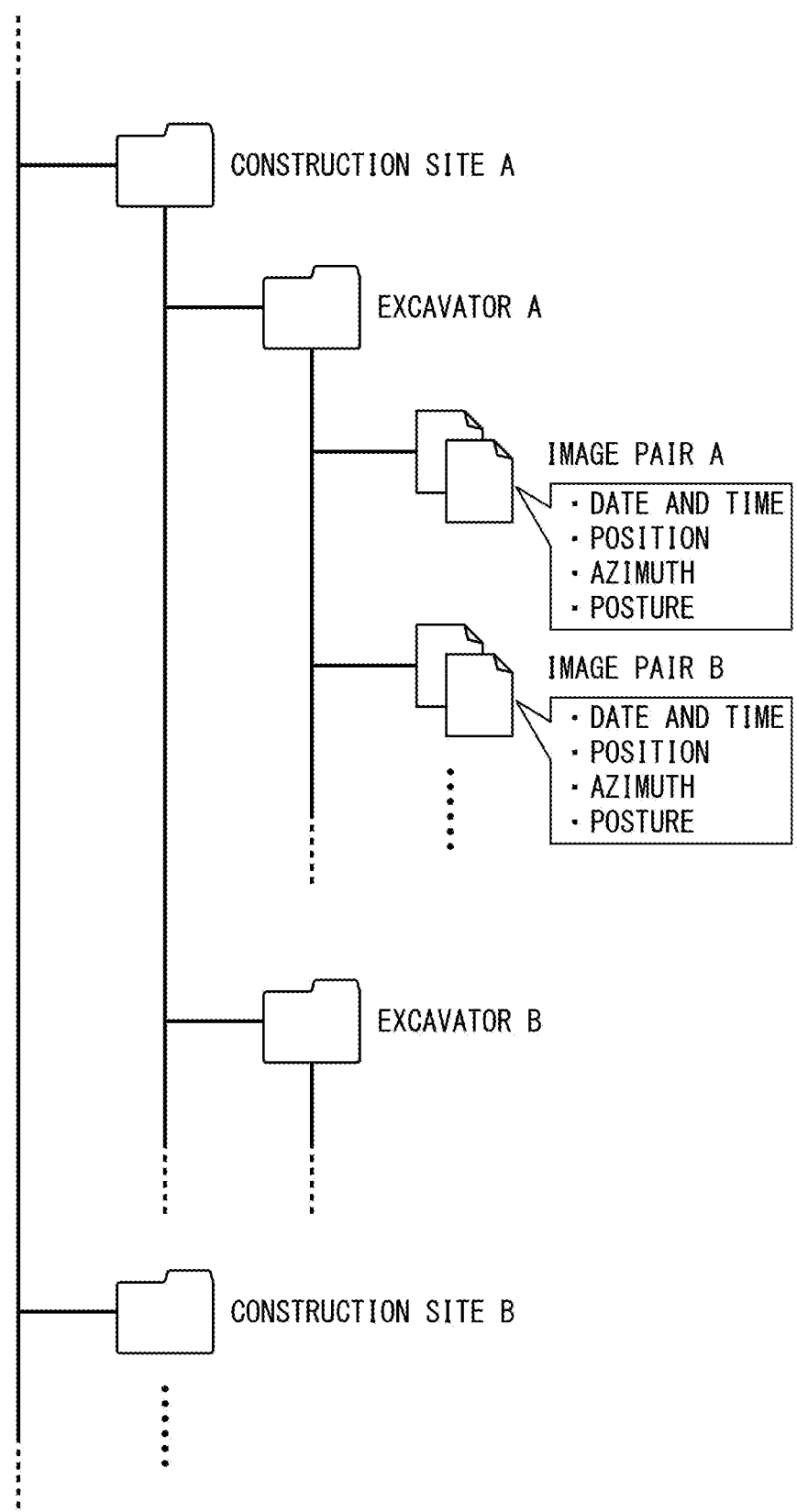
FIG. 5 illustrates an example of a method of managing a pair of images in an image storage unit.

FIG. 5 illustrates an example of a method in which the image storage unit manages an image pair.

As shown in FIG. 5, the image storage unit 233 may store image pairs by using a file system having a directory structure. For example, the image storage unit 233 stores site directories divided into respective construction sites. The image storage unit 233 stores machine directories divided into respective work machines disposed in the construction site under each site directory. The image storage unit 233 stores an image pair captured by the work machine under each machine directory. Each image pair stores therein a time point, a position, an azimuth, and a posture as attribute information. On the other hand, the image storage unit 233 may store an image pair by using a database. In this case, the image storage unit 233 stores an ID of a construction site, an ID of the hydraulic excavator 100, an imaging time, an image pair, a position, an azimuth, and a position to be associated with each other.

The processor 210 includes a data-before-work input unit 211, a list instruction unit 212, a selection unit 213, a camera parameter acquisition unit 214, a stereo measurement unit 215, an integration unit 216, and an amount-of-earthwork calculation unit 217, according to execution of the construction management program P.

The data-before-work input unit 211 receives input of data before work which is three-dimensional data representing a shape of a construction site before work from a user. An example of the data before work may be point group data indicating a shape of a construction site, generated through photogrammetry using a drone at the time of starting construction, or point group data representing a shape of the construction site, generated by a laser scanner at the time of starting construction. The data before work is not limited to the point group data, and may be face data such as TIN data. The data before work may be stored in the storage 230 in advance, and may be transmitted other computers via the network. The term "before work" may indicate a time point (the time of starting construction) before starting construction in a construction site, and may indicate a certain time point during construction.

The list instruction unit 212 receives an instruction for selection of an image pair used to calculate an amount of earthwork from a user. The user inputs the instruction by using, for example, an input device connected to the interface 240 or another computer connected to the network. The list instruction unit 212 presents a list of a plurality of image pairs stored in the image storage unit 233 to the user. In this case, the list instruction unit 212 may receive input of the end date of a period which is a calculation target of the amount of earthwork from the user, and may present a list of a plurality of image pairs captured from the construction start date to the input end date to the user. The user specifies an image pair used to calculate an amount of earthwork from the presented list. For example, the user selects a plurality of image pairs in which the construction site after work is captured from among a plurality of image pairs stored in the image storage unit 233. The list instruction unit 212 receives an instruction for selection of the specified image pair from the user. The term "after work" may indicate a certain time point during construction, and may indicate a time point (the time of completion of construction) until construction in the construction site forms the same shape as that in design data.

The selection unit 213 selects an image pair used to calculate an amount of earthwork from among the plurality of image pairs stored in the image storage unit 233 in response to the selection instruction received by the list instruction unit 212. Hereinafter, an image pair selected by the selection unit 213 will be referred to as a target image pair or a single target image pair. A target image pair in which the construction site after work is captured will be referred to as an image pair after work.

In other words, the selection unit 213 selects at least one target image pair which is a processing target from among the plurality of image pairs captured by the stereo camera 122 provided in the hydraulic excavator 100. The processing target indicates an image pair used for stereo measurement. The target image pair indicates an image pair selected as the processing target.

The camera parameter acquisition unit 214 specifies the hydraulic excavator 100 having captured the selected target image pair, and acquires the latest camera parameter related to the hydraulic excavator 100 from the camera parameter storage unit 231. The camera parameter acquisition unit 214 reads an ID of the hydraulic excavator 100 associated with each target image pair from the image storage unit 233, and acquires a camera parameter which is associated with the ID and is associated with the latest update time from the camera parameter storage unit 231.

In other words, the camera parameter acquisition unit 214 acquires the camera parameter involving the target image pair from the camera parameter storage unit 231. The term "acquire" indicates obtaining a new value. For example, the term "acquire" includes receiving a value, receiving input of a value, reading a value from a table, and calculating another value by using a certain value.

The stereo measurement unit 215 performs stereo measurement on the target image pair selected by the selection unit 213 by using the camera parameter acquired by the camera parameter acquisition unit 214, and thus calculates point group data representing a landform. The point group data is, for example, three-dimensional data formed of a plurality of points indicating three-dimensional positions in the site coordinate system. In other words, the stereo measurement unit 215 computes three-dimensional data representing the landform on the basis of the selected target image pair by using the camera parameter related to the stereo camera 122 having captured the selected target image pair.

The stereo measurement unit 215 performs stereo measurement on the image pair after work selected by the selection unit 213, and thus calculates the point group data. Hereinafter, the point group data obtained by using the image pair after work will be point group data after work.

The integration unit 216 integrates a plurality of pieces of point group data generated by the stereo measurement unit 215 into a single piece of point group data in a case where the selection unit 213 selects a plurality of target image pairs. Hereinafter, the point group data integrated by the integration unit 216 will be referred to as integrated point group data. The integrated point group data is an example of integrated three-dimensional data. In other words, the integration unit 216 computes the integrated three-dimensional data on the basis of a plurality of pieces of three-dimensional data. The integration unit 216 integrates a plurality of pieces of point group data after work so as to generate integrated point group data after work.

The integration unit 216 reduces the density of the integrated point group data to a predetermined density. For example, with respect to each of a plurality of sections into which a three-dimensional plane is divided by a predetermined width, the integration unit 216 extracts a point corresponding to a median of a height as a representative point from a plurality of points present in the section, and thus reduces the density of the integrated point group data. The integration unit 216 according to other embodiments may extract a representative point by using other methods such as extraction of a lowest point as the representative point from a plurality of points present in each of a plurality of sections.

The integration unit 216 generates face data representing a landform by disposing, for example, a triangulated irregular network (TIN) in the integrated point group data. The face data is an example of the integrated three-dimensional data. The integration unit 216 disposes the TIN in the integrated point group data after work, so as to generate data after work.

The amount-of-earthwork calculation unit 217 calculates, as an amount of earthwork, a difference between the data before work which is input from the data-before-work input unit 211 and the data after work generated by the integration unit 216. In this case, the amount-of-earthwork calculation unit 217 calculates a volume of a portion of which the data after work is located over the data before work, as a banking amount. The amount-of-earthwork calculation unit 217 calculates a volume of a portion of which the data after work is located under the data before work, as an excavation amount. Examples of a method of calculating an amount of earthwork may include a mesh method, a triangular prism method, a Prismoidal method, and an average cross section method.

<<Construction Management Method>>

Figure 6:
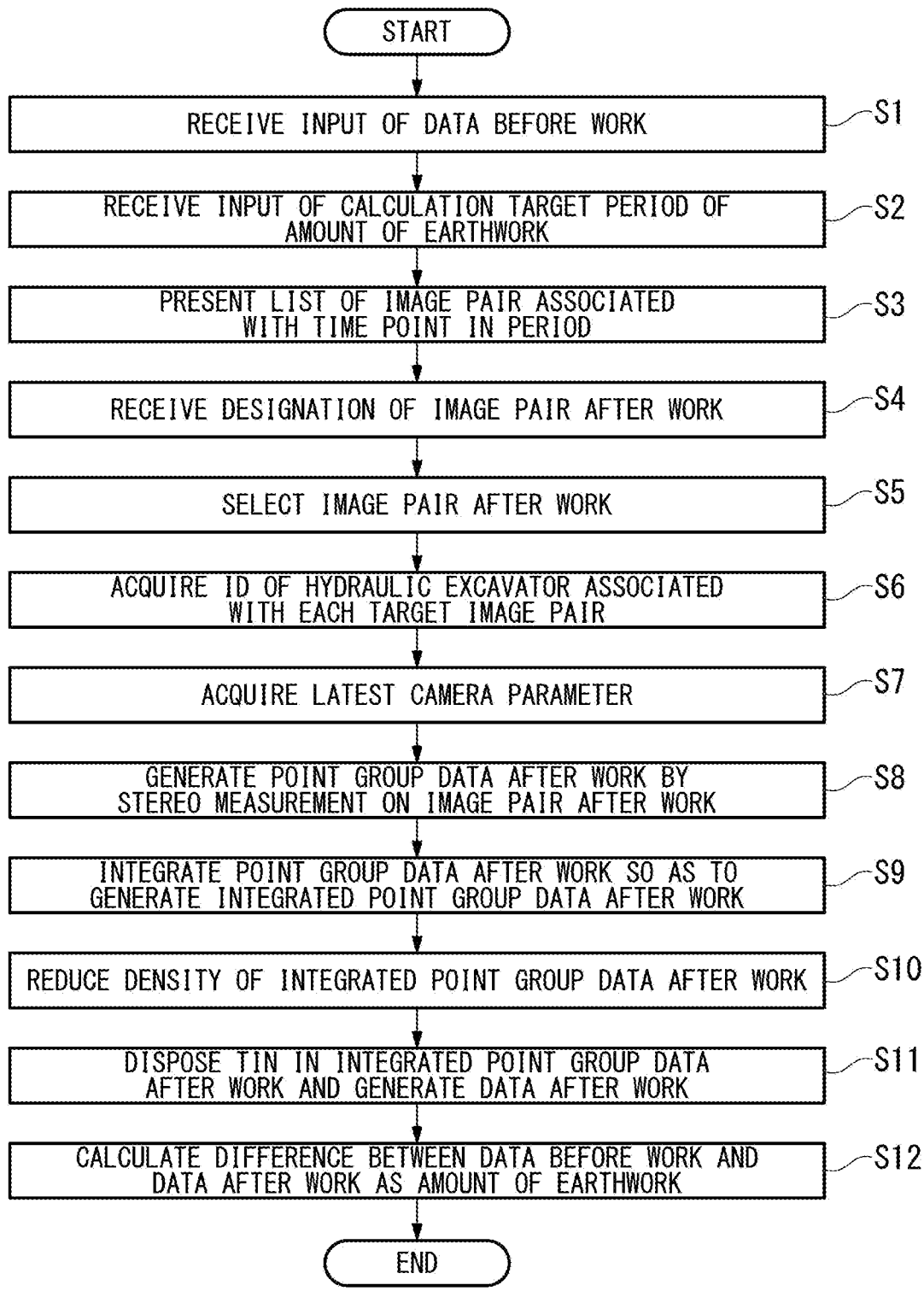
FIG. 6 is a flowchart showing an operation of a construction management device according to the first embodiment.

FIG. 6 is a flowchart showing an operation of the construction management device according to the first embodiment.

The data-before-work input unit 211 receives input of data before work which is three-dimensional data representing a shape of the construction site before work from a user (step S1). For example, the user acquires data before work in advance through photogrammetry using a drone, and uploads the data before work to the construction management device 200 from another computer. In a case where the data before work is not TIN data (for example, point group data), the data-before-work input unit 211 may dispose a TIN in the input data before work.

The list instruction unit 212 receives input of a calculation target period of an amount of earthwork from the user (step S2). Next, the list instruction unit 212 generates a list of image pairs (for example, a thumbnail list) associated with a time point in the calculation target period among a plurality of image pairs stored in the image storage unit 233, and presents the list to the user (step S3). Next, the list instruction unit 212 receives designation of one or a plurality of image pairs in which the construction site after work is captured in the list presented to the user (step S4). The selection unit 213 selects one or a plurality of image pairs after work from among the plurality of image pairs stored in the image storage unit 233 on the basis of the designation from the user (step S5).

The camera parameter acquisition unit 214 acquires an ID of the hydraulic excavator 100 associated with the selected image pair after work from the image storage unit 233 (step S6). The camera parameter acquisition unit 214 acquires a camera parameter which is associated with each read ID and is associated with the latest update time from the camera parameter storage unit 231 (step S7).

The stereo measurement unit 215 performs stereo measurement on the image pair after work selected by the selection unit 213 by using a camera parameter involving the image pair after work, a position, an azimuth, and a posture of the hydraulic excavator 100 stored in the image storage unit 233 in accordance with the image pair after work, and model specific data related to a model of the hydraulic excavator 100, and thus calculates point group data after work (step S8).

In a case where a plurality of image pairs after are selected by the selection unit 213, the integration unit 216 integrates a plurality of pieces of point group data after work so as to generate integrated point group data after work formed of a plurality of points forming the plurality of pieces of point group data (step S9). With respect to each of a plurality of sections into which a three-dimensional plane is divided by a predetermined width, the integration unit 216 extracts a point which forms the integrated point group data after work and corresponds to a median of a height as a representative point from a plurality of points present in the section, and thus reduces the density of the integrated point group data after work (step S10). The integration unit 216 disposes a TIN in the integrated point group data after work of which the density is reduced, and thus generates data after work (step S11).

The amount-of-earthwork calculation unit 217 calculates a difference between the data before work and the data after work as an amount of earthwork (step S12).

Application Examples

Here, a description will be made of usage cases of the construction management device 200 according to the first embodiment. Computation of an amount of earthwork in the construction management device 200 is performed, for example, in order to determine the progress of construction from the time of starting the construction in a construction intermediate stage in a construction site. Hereinafter, a description will be made of a method using the construction management device 200 on a construction type basis.

(Construction Type A)

In a case where excavation or banking is performed stepwise in construction in a construction site, a landform of the construction site is changed every day, that is, in a case of excavation, the landform is cut, and, in a case of banking, the landform is elevated. In a case of the construction type, an operator of the hydraulic excavator 100 periodically (for example, every day) images a current status landform of the construction site with the stereo camera 122, and thus an image pair representing the latest current status landform is stored in the image storage unit 233 every predetermined period. In this case, the construction management device 200 performs stereo measurement on each image pair captured every predetermined period, and thus three-dimensional data (data after work) of the current status landform for each predetermined period is stored in, for example, the storage 230. In this construction type, a manager designates an image pair related to the end date of a calculation target period is designated in the list in step S4, and thus the construction management device 200 can specify a landform on the end date of the calculation target period.

(Construction Type B)

In a case where construction in a construction site is sequentially completed for respective regions of the construction site, for example, in slope shaping over a predetermined distance, completed regions are expanded as the days go by in a case where a slope is shaped in order from one end of a construction target region. In a case of the construction type, whenever construction for a target region is completed, an operator images the region with the stereo camera 122. Consequently, an image pair representing the latest current status landform is stored for each region in the image storage unit 233. In this case, imaging dates of respective image pairs are different from each other. In this construction type, a manager designates only an image pair corresponding to a region in which an amount of earthwork is calculated from image pairs in a calculation target period in the list in step S4, and thus the construction management device 200 can specify a landform on the end date of the calculation target period.

Advantageous Effects

As mentioned above, the construction management device 200 according to the first embodiment selects a target image pair which is a processing target from among a plurality of image pairs captured by the stereo camera 122, and computes three-dimensional data representing a landform by using a camera parameter related to the stereo camera 122 having captured the selected target image pair. Consequently, the construction management device 200 can compute three-dimensional topography data at any time point or location.

The construction management device 200 according to the first embodiment presents a list of a plurality of image pairs to a user, and receives selection of a target image pair which is a processing target from the list. Consequently, it is possible to select only an image pair at a time point at which a construction target is completed in the usage case related to the type B. Therefore, the construction management device 200 according to the first embodiment can calculate an amount of earthwork on the basis of an appropriate measurement result.

The construction management device 200 according to the first embodiment generates integrated point group data on the basis of a plurality of pieces of point group data which are computed by using a plurality of pieces of target image pairs. Consequently, the construction management device 200 can generate point group data representing a landform in a range wider than an imaging range of a single stereo camera 122. In this case, the construction management device 200 can reduce the density of the integrated point group data by extracting a representative point of each of a plurality of sections into which a two-dimensional plane is divided on the basis of a plurality of pieces of point group data. Particularly, the construction management device 200 according to the first embodiment extracts, with respect to each section, a point corresponding to a median of a height among a plurality of points forming the plurality of point group data and present in the section, as the representative point, and thus computes the integrated point group data. Consequently, the construction management device 200 can appropriately reduce the density of the integrated point group data without changing a coordinate value of a point forming the integrated point group data.

The construction management device 200 according to the first embodiment generates face data by using integrated point group data and calculates an amount of earthwork on the basis of a difference between pieces of face data related to different time points. Consequently, the construction management device 200 can compute an amount of earthwork of any location in any period. In other embodiments, an amount of earthwork may be calculated on the basis of a difference between pieces of integrated point group data, or a difference between other pieces of integrated three-dimensional data (for example, DEM, polygon data, or voxel data) generated by using the integrated point group data.

Modification Examples

The camera parameter storage unit 231 according to the first embodiment stores an ID of the hydraulic excavator 100 and an update time to be associated with a camera parameter of the stereo camera 122 of the hydraulic excavator 100 at the update time, but is not limited thereto. For example, the camera parameter storage unit 231 according to other embodiments may store only the latest camera parameters with respect to a plurality of hydraulic excavators 100.

The list instruction unit 212 according to the first embodiment presents a list of image pairs, and receives an instruction of selection of an image pair from the list, but is not limited thereto. For example, the list instruction unit 212 according to other embodiments may present a list containing position information or time information, and may receive an instruction for selection of an image pair associated with position information or time information by receiving an instruction for the position information or the time information from the list.

The list instruction unit 212 according to the first embodiment receives input of a calculation target period of an amount of earthwork, and presents a list of image pairs related to the period, but is not limited thereto. For example, the list instruction unit 212 according to other embodiments may present a list of all image pairs stored in the image storage unit 233 instead of receiving input of a calculation target period of an amount of earthwork.

Second Embodiment

The construction management device 200 according to the first embodiment performs stereo measurement by using the latest camera parameter among a plurality of camera parameters related to the stereo camera 122 of the hydraulic excavator 100, stored in the camera parameter storage unit 231. For example, in a case where a camera parameter is periodically updated, assuming that the camera parameter is calibrated after an image pair is captured, point group data can be generated by using the calibrated parameter, and thus an amount of earthwork can be computed by using a measurement result with a slight measurement error. On the other hand, after an image pair is captured, the stereo camera 122 may be moved for a certain reason, and thus a camera parameter may be calibrated in order to cope with the deviation. In this case, when stereo measurement is performed by using the latest camera parameter, the stereo measurement is performed by using an image pair captured before the stereo camera is deviated on the basis of a camera parameter after the stereo camera is deviated, and thus appropriate point group data may not be obtained. Therefore, the construction management device 200 according to the second embodiment performs stereo measurement by using a camera parameter at an imaging time point of an image pair.

The construction management device 200 according to the second embodiment is different from that of the first embodiment in terms of an operation of the camera parameter acquisition unit 214. The camera parameter acquisition unit 214 according to the second embodiment specifies the hydraulic excavator 100 having captured a selected target image pair, and acquires a camera parameter at an imaging time point of the target image pair related to the hydraulic excavator 100 from the camera parameter storage unit 231. The camera parameter acquisition unit 214 reads an ID of the hydraulic excavator 100 and an imaging time associated with each target image pair from the image storage unit 233, and acquires a camera parameter which is associated with the ID and is associated with an update time right before the imaging time, from the camera parameter storage unit 231.

<<Construction Management Method>>

Figure 7:
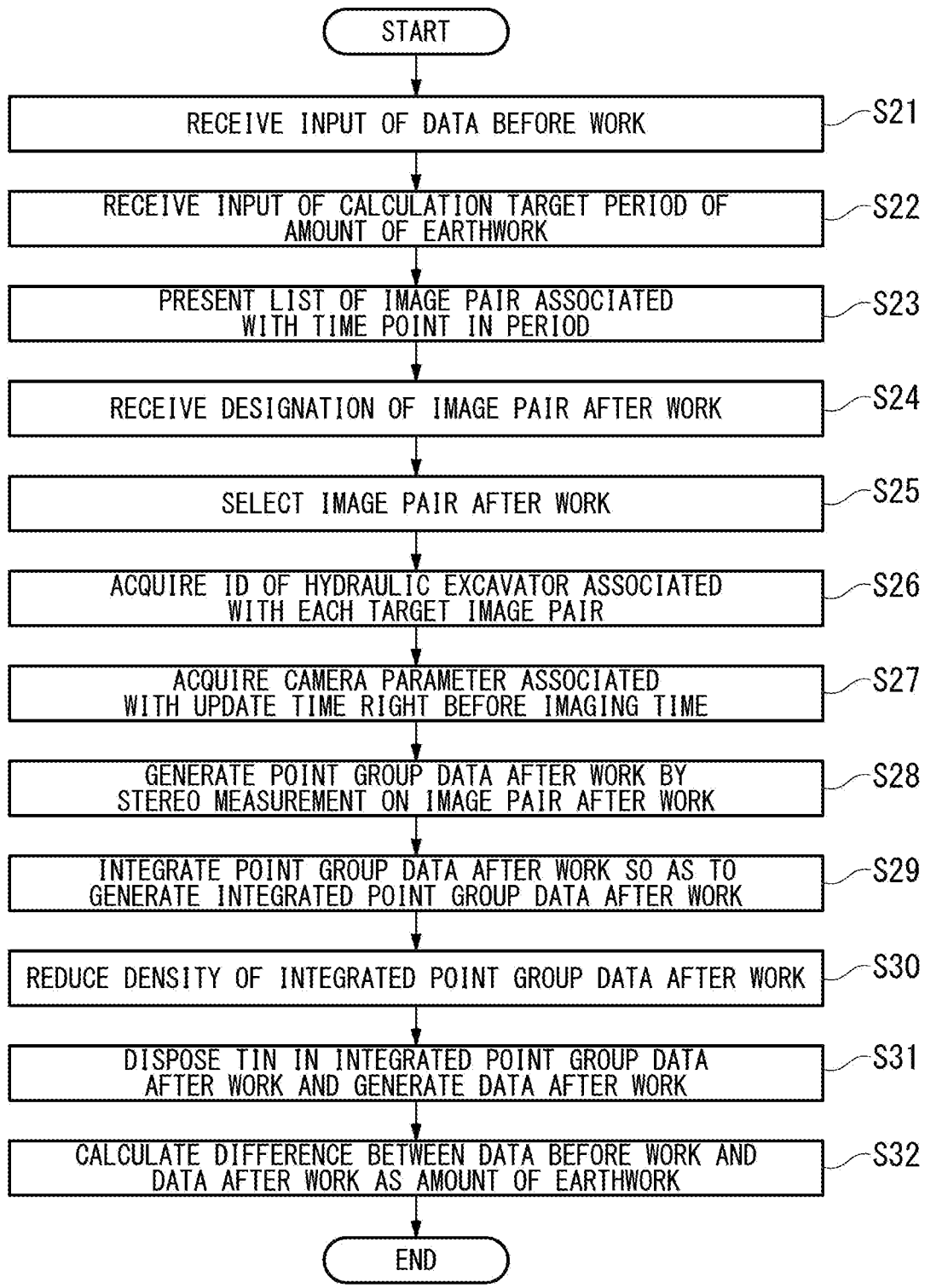
FIG. 7 is a flowchart showing an operation of a construction management device according to a second embodiment.

FIG. 7 is a flowchart showing an operation of the construction management device according to the second embodiment.

The data-before-work input unit 211 receives input of data before work which is three-dimensional data representing a shape of the construction site before work from a user (step S21). The list instruction unit 212 receives input of a calculation target period of an amount of earthwork from the user (step S22). Next, the list instruction unit 212 generates a list of image pairs associated with a time point in the calculation target period among a plurality of image pairs stored in the image storage unit 233, and presents the list to the user (step S23). Next, the list instruction unit 212 receives designation of one or a plurality of image pairs in which the construction site after work is captured in the list from the user (step S24). The selection unit 213 selects one or a plurality of image pairs after work from among the plurality of image pairs stored in the image storage unit 233 on the basis of the designation from the user (step S25).

The camera parameter acquisition unit 214 acquires an ID of the hydraulic excavator 100 and an imaging time associated with the each image pair after work from the image storage unit 233 (step S26). The camera parameter acquisition unit 214 acquires a camera parameter which is associated with each read ID and is associated with an update time right before the read imaging time, from the camera parameter storage unit 231 (step S27).

The construction management device performs processes from step S28 to step S32. The processes from step S28 to step S32 are the same as the processes from step S8 to step S12 of the first embodiment.

Advantageous Effects

As mentioned above, the construction management device 200 according to the second embodiment acquires a camera parameter related to an update time right before an imaging time of a target image pair, that is, a camera parameter at a time point corresponding to the imaging time, from the camera parameter storage unit 231, and obtains point group data on the basis of the camera parameter. Consequently, the construction management device 200 can appropriately obtain point group data, for example, even in a case where the stereo camera 122 is moved after an image pair is captured.

Modification Examples

The construction management device 200 according to other embodiments may acquire a camera parameter related to an update time closest to an imaging time, and may obtain point group data on the basis of the camera parameter. For example, in a case where a camera parameter A of which an update time is January 1 and a camera parameter of which an update time is February $1^{st}$ are stored in the camera parameter storage unit 231, and an imaging time of an image pair is January $31^{st}$, the construction management device 200 may obtain point group data on the basis of the camera parameter B. The construction management device 200 according to other embodiments may obtain point group data on the basis of a camera parameter which is obtained by using a plurality of camera parameters related to update times before and after an imaging time. The construction management device 200 according to other embodiments may obtain point group data on the basis of a camera parameter related to an update time right after an imaging time.

A camera parameter related to an update time right before an imaging time, a camera parameter related to an update time right after an imaging time, a camera parameter related to an update time closest to an imaging time, and a camera parameter which is obtained by using a plurality of camera parameters related to update times before and after an imaging time are all examples of a camera parameter involving an imaging time of a target image pair.

Other Embodiments

As mentioned above, one embodiment has been described with reference to the drawings, but a specific configuration is not limited to the above-described configurations, and various design changes may occur.

In the embodiments, the control device 125 of the hydraulic excavator 100 transmits an image pair to the construction management device 200, and the construction management device 200 calculates point group data on the basis of the received image pair, but this is only an example. For example, in other embodiments, the control device 125 of the hydraulic excavator 100 may calculate point group data by using an image pair captured by the stereo camera 122 and a camera parameter stored in the camera parameter storage unit 331, and the control device 125 may transmit the point group data to the construction management device 200. In this case, the storage 230 includes a storage unit realizing the same function as that of the image storage unit 233, and the camera parameter storage unit 331 stores a plurality of camera parameters along with the update date and time whenever a camera parameter is updated. However, since a data amount of an image pair is smaller than that of point group data, a communication load and a storage capacity can be reduced by transmitting the image pair to the construction management device 200 as in the embodiments.

The construction management device 200 according to the embodiments calculates an amount of earthwork after the density of integrated point group data is reduced, but is not limited thereto. For example, the construction management device 200 may calculate an amount of earthwork by using all points of integrated point group data without reducing the density of the integrated point group data.

The construction management device 200 according to the embodiments is a computer separate from that of the hydraulic excavator 100, but is not limited thereto. For example, the construction management device 200 according to other embodiments may be mounted in the control device 125 of the hydraulic excavator 100. In other words, in other embodiments, the control device 125 of the hydraulic excavator 100 may integrate point group data or calculate an amount of earthwork.

The construction management device according to the embodiments generates integrated point group data by using only a plurality of pieces of point group data generated on the basis of an image pair, but is not limited thereto. For example, the construction management device 200 according to other embodiments may generate integrated point group data by also using point group data generated on the basis of other means such as aerial photogrammetry using an unmanned aircraft (drone), measurement using a laser scanner, a measurement result of a tip position of the work equipment 110, and a measurement result of a crawler position of a work machine, in addition to the point group data generated on the basis of an image pair.

The construction management device 200 according to the embodiments prepares two pieces of three-dimensional data (integrated three-dimensional data) related to different time points, such as data before work and data after work, and calculates an amount of earthwork on the basis of a difference between the two pieces of three-dimensional data, but is not limited thereto. For example, the data before work may be three-dimensional data calculated by performing stereo measurement on an image pair. In other words, both of the two pieces of three-dimensional data may be calculated by using an image pair. The data after work may be calculated regardless of an image pair after work. For example, the data after work may be three-dimensional data generated by computer aided design (CAD), and may be three-dimensional data generated on the basis of other means such as aerial photogrammetry, measurement using a laser scanner, a measurement result of a tip position of the work equipment 110, and a measurement result of a crawler position of a work machine.

Figure 8:
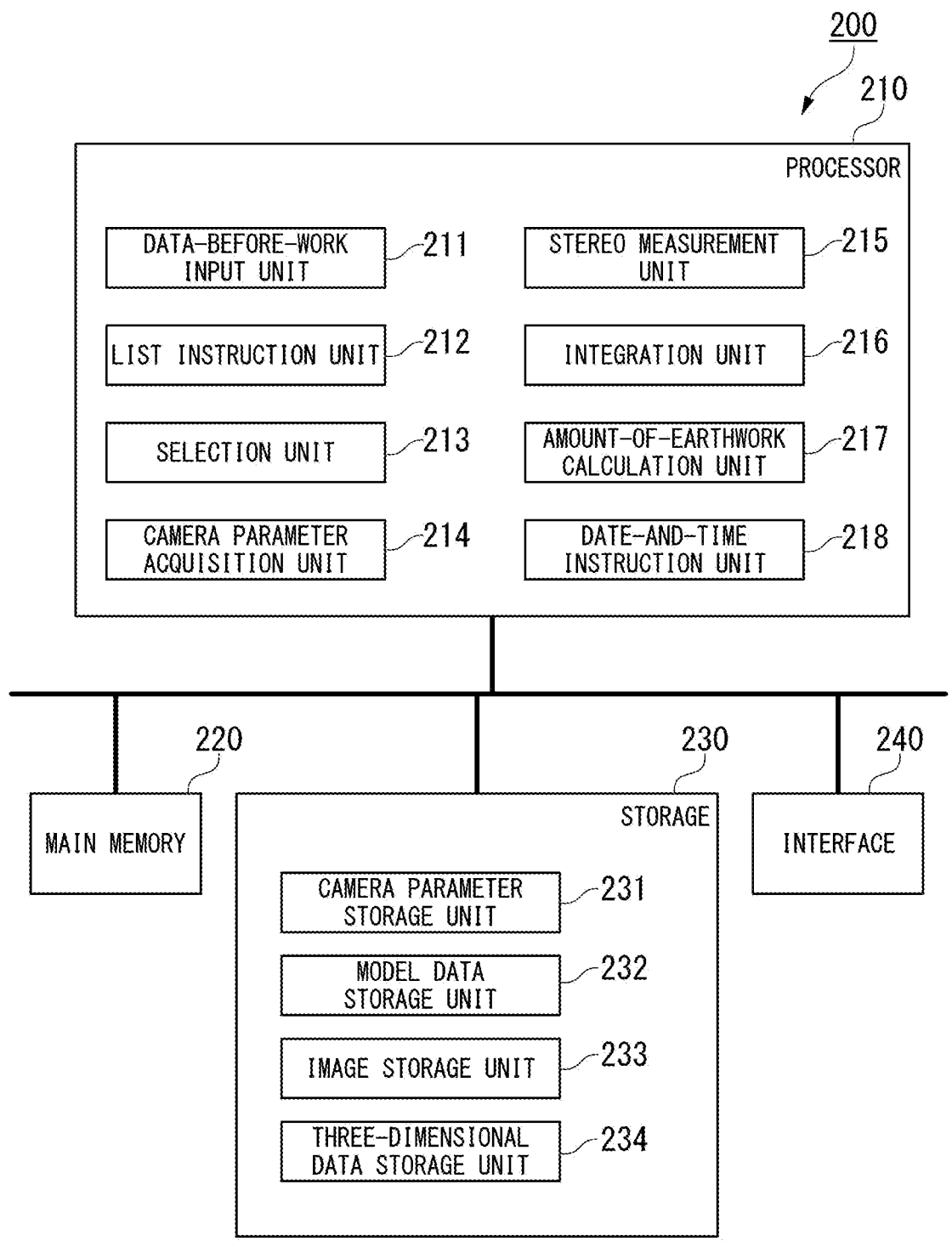
FIG. 8 is a schematic diagram showing a configuration of a construction management device according to a third embodiment.

FIG. 8 is a schematic diagram showing a configuration of a construction management device according to a third embodiment.

The construction management device 200 according to the embodiments presents a list of a plurality of image pairs to a user, and receives selection of a target image pair which is a processing target from the list, but is not limited to the embodiments. For example, a construction management device 200 according to the third embodiment may include a date-and-time instruction unit 218 instead of the list instruction unit 212 or in addition to the list instruction unit 212, as shown in FIG. 8. The construction management device 200 according to the third embodiment secures a storage region of a three-dimensional data storage unit 234 on the storage 230.

The stereo measurement unit 215 according to the third embodiment generates point group data by using an image pair captured every predetermined period (for example, every day) as in the construction type A, and the integration unit 216 integrates pieces of generated point group data so as to generate three-dimensional data. The integration unit 216 stores the generated three-dimensional data to be associated with the date and time in the three-dimensional data storage unit 234.

The date-and-time instruction unit 218 receives input of the date and time from a user, and reads three-dimensional data associated with the input date and time from the three-dimensional data storage unit 234. For example, the date-and-time instruction unit 218 receives input of date and time before work and the date and time after work, and reads three-dimensional data before work and three-dimensional data after work. The date-and-time instruction unit 218 may receive input of the date from a user. In this case, the date is an example of the date and time.

The amount-of-earthwork calculation unit 217 computes an amount of earthwork on the basis of the three-dimensional data before work and the three-dimensional data after work read by the date-and-time instruction unit 218.

The construction management device 200 according to the third embodiment can easily compute an amount of earthwork in a case such as the construction type A.

Figure 9:
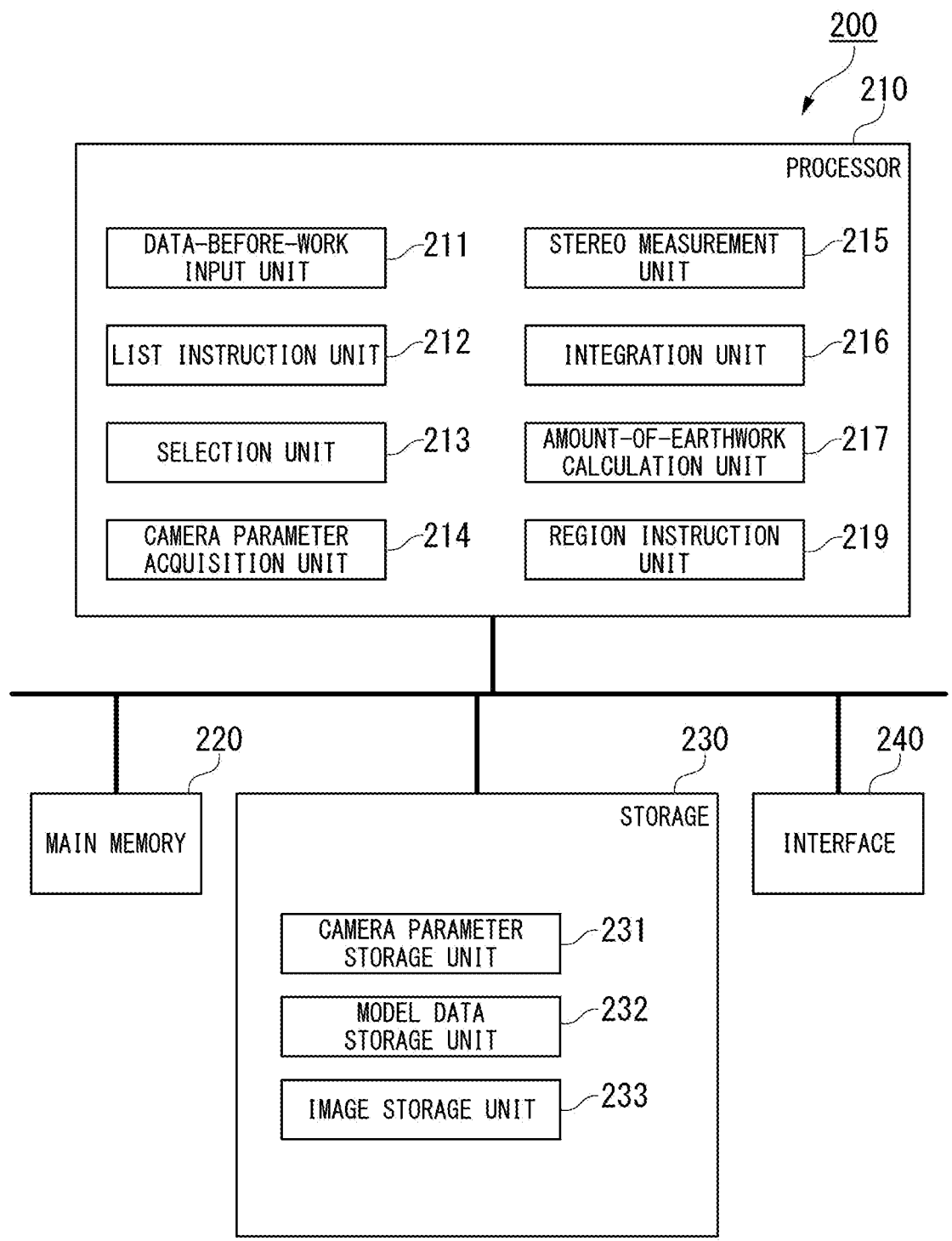
FIG. 9 is a schematic diagram showing a configuration of a construction management device according to a fourth embodiment.

FIG. 9 is a schematic diagram showing a configuration of a construction management device according to a fourth embodiment. A construction management device 200 according to other embodiments may include a region instruction unit 219 instead of the list instruction unit 212 or in addition to the list instruction unit 212, as shown in FIG. 9.

The region instruction unit 219 receives input of a construction target region from a user. For example, a plurality of coordinates in a construction site are input, and thus the region instruction unit 219 receives input of a region closed by the coordinates.

In this case, the selection unit 213 may select an image pair associated with a position involving the region designated by the region instruction unit 219 from among a plurality of image pairs stored in the image storage unit 233. An example of the position involving the designated region may include a position included in the designated region. The construction management device 200 according to the fourth embodiment can select an image pair of a slope on the basis of position information of the image pair without a user selecting, one by one, image pairs captured when each slope is completed, in a case such as the construction type B.

In other embodiments, the construction management device 200 may include at least one of the list instruction unit 212, the date-and-time instruction unit 218, and the region instruction unit 219. In this case, the selection unit 213 may select an image pair satisfying all conditions for which an instruction is given, or an image pair satisfying at least one of the conditions for which an instruction is given.

The amount-of-earthwork calculation unit 217 according to the embodiments calculates a difference between data before work and data after work which are TIN data as an amount of earthwork, but is not limited thereto. For example, the amount-of-earthwork calculation unit 217 according to other embodiments may calculate an amount of earthwork through comparison between pieces of point group data.

The hydraulic excavator 100 according to the embodiments captures an image pair by using the stereo camera 122 having a pair of imaging devices, but is not limited thereto. For example, the stereo camera 122 according to other embodiments may be configured with a single imaging device which can perform stereo imaging. In this case, the stereo camera 122 may capture an image pair by imaging a target at different timings from two different positions with the single imaging device. In other words, the hydraulic excavator 100 may capture an image pair by using a pair of imaging devices, and may capture an image pair by using a single imaging device. In other words, the image pair may be an image pair which is simultaneously captured by a single imaging device, and may be an image pair generated through stereo imaging at different timings by a single imaging device. In a case where the stereo camera 122 is configured with a single imaging device which can perform stereo imaging, camera parameters include internal parameters and vehicle body parameters, and do not include external parameters. In other words, the "imaging device" includes a pair of imaging devices and a single imaging device which can perform stereo imaging.

In the construction management device 200 according to the embodiments, a description has been made of a case where the construction management program P is stored in the storage 230, but this is only an example. For example, in other embodiments, the construction management program P may be delivered to the construction management device 200 via a communication line. In this case, the construction management device 200 develops the delivered construction management program P to the main memory 220, and executes the processes.

The construction management program P may realize some of the functions. For example, the construction management program P may realize the functions through a combination with another construction management program P already stored in the storage 230 or a combination with another construction management program P installed in another device.

The construction management device 200 may include a programmable logic device (PLD) in addition to the configuration or instead of the configuration. Examples of the PLD may include a programmable array logic (PAL), a generic array logic (GAL), a complex programmable logic device (CPLD), and a field programmable gate array (FPGA). In this case, some of the functions realized by the processor 210 may be realized by the PLD.

INDUSTRIAL APPLICABILITY

According to the aspect, the construction management device can compute three-dimensional data of a landform at anytime point or any location.

REFERENCE SIGNS LIST

1: CONSTRUCTION MANAGEMENT SYSTEM
100: HYDRAULIC EXCAVATOR
122: STEREO CAMERA
123: POSITION/AZIMUTH CALCULATOR
124: INCLINATION DETECTOR
125: CONTROL DEVICE
200: CONSTRUCTION MANAGEMENT DEVICE
210: PROCESSOR
220: MAIN MEMORY
230: STORAGE
240: INTERFACE
211: DATA-BEFORE-WORK INPUT UNIT
212: LIST INSTRUCTION UNIT
213: SELECTION UNIT
214: CAMERA PARAMETER ACQUISITION UNIT
215: STEREO MEASUREMENT UNIT
216: INTEGRATION UNIT
217: AMOUNT-OF-EARTHWORK CALCULATION UNIT
218: DATE-AND-TIME INSTRUCTION UNIT

219: REGION INSTRUCTION UNIT
231: CAMERA PARAMETER STORAGE UNIT
232: MODEL DATA STORAGE UNIT
233: IMAGE STORAGE UNIT
234: THREE-DIMENSIONAL DATA STORAGE UNIT

The invention claimed is:

1. A construction management device generating three-dimensional data of a construction site by using a plurality of work machines, each of the plurality of work machines being provided with a stereo camera configured with at least one pair of imaging devices, the construction management device comprising:
a camera parameter storage unit that stores a plurality of camera parameters associated with each imaging device of the stereo camera of the plurality of work machines and including external parameters indicating a positional relationship between a pair of imaging devices;
a selection unit that selects a target image pair which is a processing target on the basis of input from a user from among a plurality of image pairs captured by the imaging devices provided in the plurality of work machines; and
a stereo measurement unit that generates three-dimensional data representing a landform of a periphery of a work machine having captured the target image pair on the basis of the selected target image pair, by using a camera parameter related to the imaging device of the work machine having captured the selected target image pair among the plurality of camera parameters stored in the camera parameter storage unit,
wherein the stereo measurement unit generates the three-dimensional data on the basis of a camera parameter related to an update time closest to the imaging time.

2. The construction management device according to claim 1, further comprising:
an integration unit that integrates pieces of the three-dimensional data generated by the stereo measurement unit with each other,
wherein the selection unit selects a plurality of image pairs based on input from the user, and
wherein the integration unit integrates a plurality of pieces of three-dimensional data obtained on the basis of the plurality of selected image pairs with each other.

3. The construction management device according to claim 1,
wherein the plurality of camera parameters stored in the camera parameter storage unit are stored to be associated with a plurality of respective time points of each imaging device of the plurality of work machines, and
wherein the stereo measurement unit generates the three-dimensional data on the basis of the selected target image pair by using a camera parameter at an imaging time from among camera parameters associated with the plurality of time points.

4. The construction management device according to claim 1, further comprising:
a date-and-time instruction unit that receives input of the date and time; and
a three-dimensional data storage unit that stores three-dimensional data to be associated with a plurality of dates and times,
wherein the selection unit selects the three-dimensional data associated with the date and time which is input to the date-and-time instruction unit from among a plurality of pieces of three-dimensional data stored in the three-dimensional data storage unit.

5. The construction management device according to claim 1, further comprising:
a region instruction unit that receives input of a construction target region,
wherein the selection unit selects the target image pair captured at a position involving the region which is input to the region instruction unit.

6. A construction management method of generating three-dimensional data of a construction site by using a plurality of work machines, each of the plurality of work machines being provided with a stereo camera configured with at least one pair of imaging devices, the construction management method comprising the steps of:
storing a plurality of camera parameters associated with each imaging device of the stereo camera of the plurality of work machines and including external parameters indicating a positional relationship between a pair of imaging devices;
selecting a target image pair which is a processing target on the basis of input from a user from among image pairs captured by the imaging devices provided in the work machines; and
generating three-dimensional data representing a landform of a periphery of a work machine having captured the target image pair on the basis of the selected target image pair, by using a camera parameter related to the imaging device of the work machine having captured the selected target image pair among the plurality of camera parameters stored in the camera parameter storage unit,
wherein the three-dimensional data is generated on the basis of a camera parameter related to an update time closest to the imaging time.

7. The construction management method according to claim 6,
wherein, in the step of selecting the target image pair, a plurality of image pairs based on input from the user are selected, and
wherein the construction management method further comprises a step of integrating a plurality of pieces of the generated three-dimensional data with each other.

8. The construction management device according to claim 2,
wherein the plurality of camera parameters stored in the camera parameter storage unit are stored to be associated with a plurality of respective time points of each imaging device of the plurality of work machines, and
wherein the stereo measurement unit generates the three-dimensional data on the basis of the selected target image pair by using a camera parameter at an imaging time from among camera parameters associated with the plurality of time points.

9. The construction management device according to claim 2, further comprising:
a date-and-time instruction unit that receives input of the date and time; and
a three-dimensional data storage unit that stores three-dimensional data to be associated with a plurality of dates and times,
wherein the selection unit selects the three-dimensional data associated with the date and time which is input to the date-and-time instruction unit from among a plurality of pieces of three-dimensional data stored in the three-dimensional data storage unit.

10. The construction management device according to claim 3, further comprising:

a date-and-time instruction unit that receives input of the date and time; and a three-dimensional data storage unit that stores three-dimensional data to be associated with a plurality of dates and times, wherein the selection unit selects the three-dimensional data associated with the date and time which is input to the date-and-time instruction unit from among a plurality of pieces of three-dimensional data stored in the three-dimensional data storage unit.

11. The construction management device according to claim 8, further comprising:

a date-and-time instruction unit that receives input of the date and time; and a three-dimensional data storage unit that stores three-dimensional data to be associated with a plurality of dates and times, wherein the selection unit selects the three-dimensional data associated with the date and time which is input to the date-and-time instruction unit from among a plurality of pieces of three-dimensional data stored in the three-dimensional data storage unit.

12. The construction management device according to claim 2, further comprising:

a region instruction unit that receives input of a construction target region, wherein the selection unit selects the target image pair captured at a position involving the region which is input to the region instruction unit.

13. The construction management device according to claim 3, further comprising:

a region instruction unit that receives input of a construction target region, wherein the selection unit selects the target image pair captured at a position involving the region which is input to the region instruction unit.

14. The construction management device according to claim 4, further comprising:

a region instruction unit that receives input of a construction target region, wherein the selection unit selects the target image pair captured at a position involving the region which is input to the region instruction unit.

15. The construction management device according to claim 8, further comprising:

a region instruction unit that receives input of a construction target region, wherein the selection unit selects the target image pair captured at a position involving the region which is input to the region instruction unit.

16. The construction management device according to claim 9, further comprising:

a region instruction unit that receives input of a construction target region, wherein the selection unit selects the target image pair captured at a position involving the region which is input to the region instruction unit.

17. The construction management device according to claim 10, further comprising:

a region instruction unit that receives input of a construction target region, wherein the selection unit selects the target image pair captured at a position involving the region which is input to the region instruction unit.

18. The construction management device according to claim 11, further comprising:

a region instruction unit that receives input of a construction target region, wherein the selection unit selects the target image pair captured at a position involving the region which is input to the region instruction unit.

\* \* \* \* \*